(12) United States Patent
Summerer

(10) Patent No.: US 7,762,805 B2
(45) Date of Patent: Jul. 27, 2010

(54) INJECTION MOULDING MACHINE HAVING A PLURALITY OF DE-MOULDING DIRECTIONS

(76) Inventor: Franz Josef Summerer, Gansbach 25, 83253 Rimsting (DE)

( * ) Notice: Subject to any disclaimer, the term of this patent is extended or adjusted under 35 U.S.C. 154(b) by 411 days.

(21) Appl. No.: 11/819,322

(22) Filed: Jun. 26, 2007

(65) Prior Publication Data

US 2008/0054522 A1   Mar. 6, 2008

(30) Foreign Application Priority Data

Jun. 26, 2006   (DE) .................. 10 2006 029 208

(51) Int. Cl.
*B29C 45/10* (2006.01)
(52) U.S. Cl. .................. 425/556; 425/588; 425/589
(58) Field of Classification Search .......... 425/188, 425/195, 556, 588, 589
See application file for complete search history.

(56) References Cited

U.S. PATENT DOCUMENTS 4,708,625 A  *  11/1987  Arend ................... 425/589
2005/0285303 A1*  12/2005  Balint et al. ............. 425/112

FOREIGN PATENT DOCUMENTS

| DE | 102 27 636 A1 | 1/2004 |
| DE | 10 2005 011 311 B3 | 5/2006 |
| DE | 2004 038 852 B4 | 6/2006 |

* cited by examiner

*Primary Examiner*—Jill L Heitbrink

(57) ABSTRACT

An injection moulding device for producing an injection moulding has a first (16a, 16b) and a second (14) mould plate which can be moved relative to each other in the closing direction. Furthermore, the injection moulding device comprises a mechanism (17a, 17b) for repositioning at least one (16a, 16b) of the mould plates in such a way that at least two different de-moulding directions (R1, R2) in relation to the injection moulding can be implemented.

11 Claims, 9 Drawing Sheets

Detail C

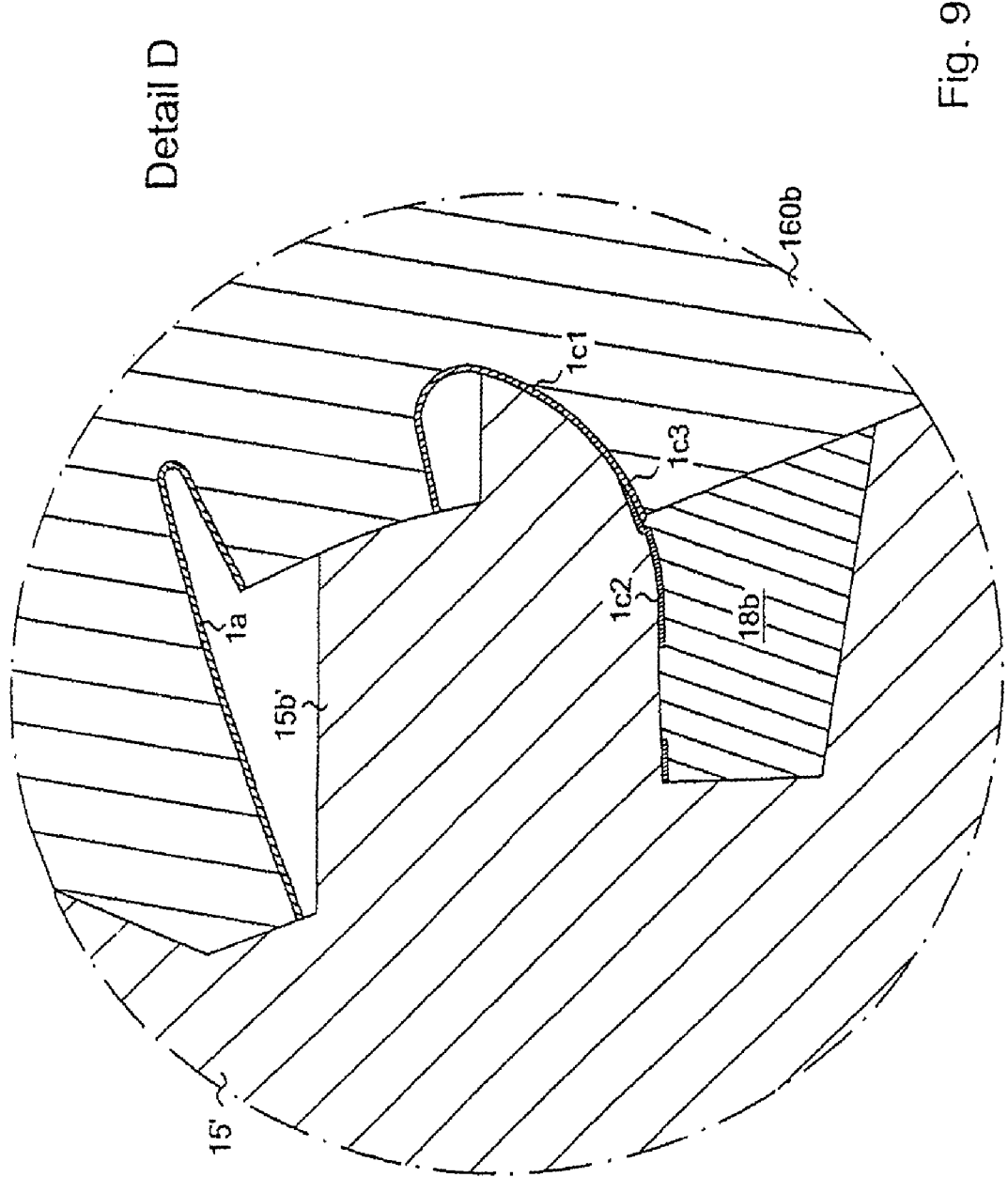

INJECTION MOULDING MACHINE HAVING A PLURALITY OF DE-MOULDING DIRECTIONS

CROSS REFERENCE TO RELATED APPLICATIONS

This application claims the benefit of German Application Number 10 2006 029 208.1, filed on Jun. 26, 2006, the disclosure of which is incorporated herein by reference.

The invention relates to an injection moulding device for producing injection mouldings while using at least two different de-moulding directions. Furthermore, the invention relates to an injection moulding machine having such an injection moulding device and also to a method for producing injection mouldings by carrying out at least two de-moulding steps with different de-moulding directions.

The production of what are known as undercut mouldings by injection moulding is complicated, since direct de-moulding of undercut parts is not possible. The ability to de-mould an undercut part can be ensured by means of complicated contour slider constructions in the mould.

The document DE 10 2005 011 31 B3 describes a mould with which an injection moulding having an undercut can be fabricated. The mould comprises a mould insert formed as a slider which, when the mould is opened, is moved out of the undercut along an axis oriented obliquely with respect to the opening direction. This solution is complicated in design terms and exhibits no modularity in relation to the production of differently shaped undercut injection mouldings.

The invention is based on the object of providing a device for producing undercut injection mouldings which has a simple construction and can therefore be implemented inexpensively. Furthermore, the invention is aimed at specifying a method for producing undercut injection mouldings having the aforementioned properties.

The object on which the invention is based is achieved by the features of the independent claims. Expedient and advantageous refinements and developments of the invention are specified in the subclaims.

According to Claim 1, an injection moulding device according to the invention has a first and a second mould plate which can be moved relative to each other in the closing direction. Furthermore, the injection moulding device according to the invention comprises a mechanism for repositioning at least one of the mould plates with respect to the closing direction in such a way that at least two different de-moulding directions in relation to the injection moulding can be implemented.

An injection moulding device of this type permits the production of an injection moulding having an undercut contour in a two-stage process. In a first step, a first section of the injection moulding is produced by using a first de-moulding direction (in relation to the injection moulding). Following the production of this first section, the repositionable mould plate is repositioned with respect to the closing direction. As a result, a second de-moulding direction (in relation to the injection moulding) is aligned with the predefined closing direction of the injection moulding device. By means of further closing and opening of the repositioned mould plate with respect to the mould plate or another mould plate, a second section of the injection moulding can therefore be produced and, together with the first section, results in an undercut injection moulding.

In other words, in the solution according to the invention, the ability to reposition the mould plate achieves the situation where a first section of the injection moulding to be produced can be changed in its position such that, when a second section leading to an undercut moulding is injection-moulded onto the first section, the ability of the injection moulding to be de-moulded is still then ensured. In this case, it is advantageous that, on account of the change in the position of the first section, no complicated oblique contour slider arrangements in the mould are needed. This makes it possible to save space in the mould, which is particularly advantageous in particular when other sliders are needed in the mould (e.g. for the production of domes or the like on the injection moulding). Furthermore, the fact that the injection moulding device according to the invention has a modular construction is advantageous on account of the ability to combine the various mould plates with the mechanism for repositioning the mould plate.

The mechanism preferably comprises a rotary bearing holding the repositionable mould plate and having a rotary bearing axis oriented obliquely with respect to the closing direction. The repositioning of the mould plate can be achieved by rotating the obliquely mounted mould plate in the rotary bearing.

According to a likewise preferred alternative refinement, the mechanism has a bearing element having a curved surface, it being possible for the repositionable mould plate to be displaced or pivoted along the curved surface of the bearing element. In this way, a particularly inexpensive implementation of the mechanism is created.

In both cases (rotary bearing or curved bearing shells), the repositioning of the mould plate achieves the situation where a contoured section of the injection moulding which cannot be de-moulded in the machine closing direction is brought into a position in which it can be de-moulded.

The repositionable mould plate is preferably a hollow plate. However, it is also possible for a core mould plate to be used as the repositionable mould plate.

The injection moulding device according to the invention can be integrated into injection moulding machines in different ways. A first preferred possibility is distinguished by the fact that the injection moulding machine comprises a turning plate surrounded by two holding plates, the mechanism for repositioning at least one mould plate being arranged on the turning plate or on the two holding plates. In an injection moulding machine of this type, which is also designated a turning plate machine, use is made of the storey effect, as it is known, which is based on the fact that, with respect to the action of force, moulds connected in series (as opposed to moulds arranged in parallel) need no increase in the machine closure-maintaining force.

A turning plate machine according to the invention can either be designed in such a way that the turning plate can be rotated about a turning axis which runs in a plane parallel to the holding plates and is oriented at right angles to the closing direction, or it is also possible for the turning plate to be rotated about a turning axis which runs in a plane at right angles to the holding plates and is oriented at right angles to the closing direction. In principle, however, the injection moulding device according to the invention can also be used in conventional 2-plate injection moulding machines, in this case an increased closure-maintaining force of the machine being needed on account of the parallel arrangement of two moulds (for the production of the two sections of the injection moulding).

An injection moulding according to the invention comprises at least two moulding sections connected integrally to each other by being injection-moulded on, which are arranged in such a way that the injection moulding according to the invention has an undercut.

The invention will be explained in more detail below by way of example with reference, to the drawings, in which:

FIG. 9 shows the detail D from FIG. 8 in an enlarged sectional illustration.

Figure 1:
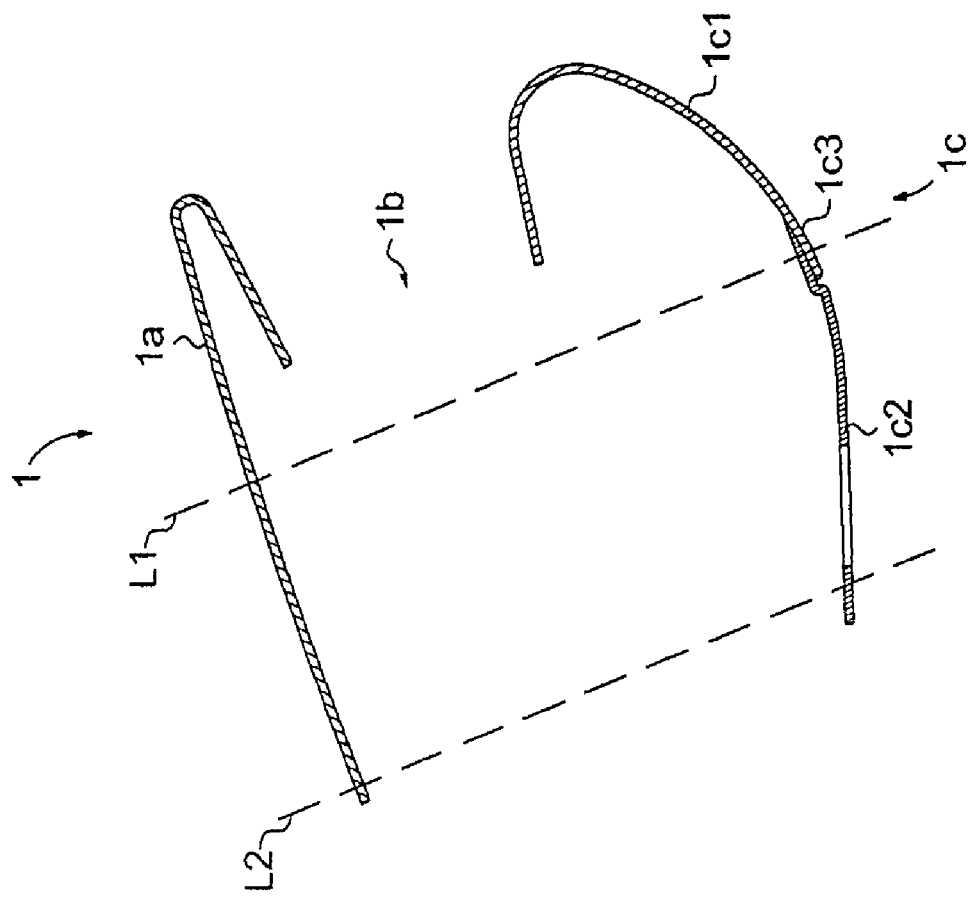
FIG. 1 shows a sectional illustration of an injection moulding having an undercut and fabricated from two sections.

FIG. 1 shows a cross section of an undercut injection moulding 1 using the example of a plastic dashboard cladding for a motor vehicle. The sectional view shows an upper subregion 1$a$ of the dashboard cladding, runs through an opening 1$b$, for the instrument area and comprises a lower subregion 1$c$ which forms the connection to the foot space. The dashboard cladding 1 has an undercut, since its internal dimension along the line L1 is greater than along the line L2. Consequently, de-moulding of the injection moulding 1 via a mould core having an appropriate shape would not be possible. The injection moulding 1 therefore consists of two sections, namely a first section, which is implemented by the upper subregion 1$a$ and a part 1$c$1 of the lower subregion 1$c$ of the injection moulding 1, and a second section 1$c$2, which extends over the remaining part of the lower subregion 1$c$ of the injection moulding 1. The two sections 1$a$, 1$c$1 and 1$c$2 are non-detachably connected to each other at the connecting point 1$c$3 by being injection-moulded on. Both the first section 1$a$, 1$c$1 and the second section 1$c$2 of the injection moulding 1, considered on their own, in each case have no contoured undercut.

Figure 2:
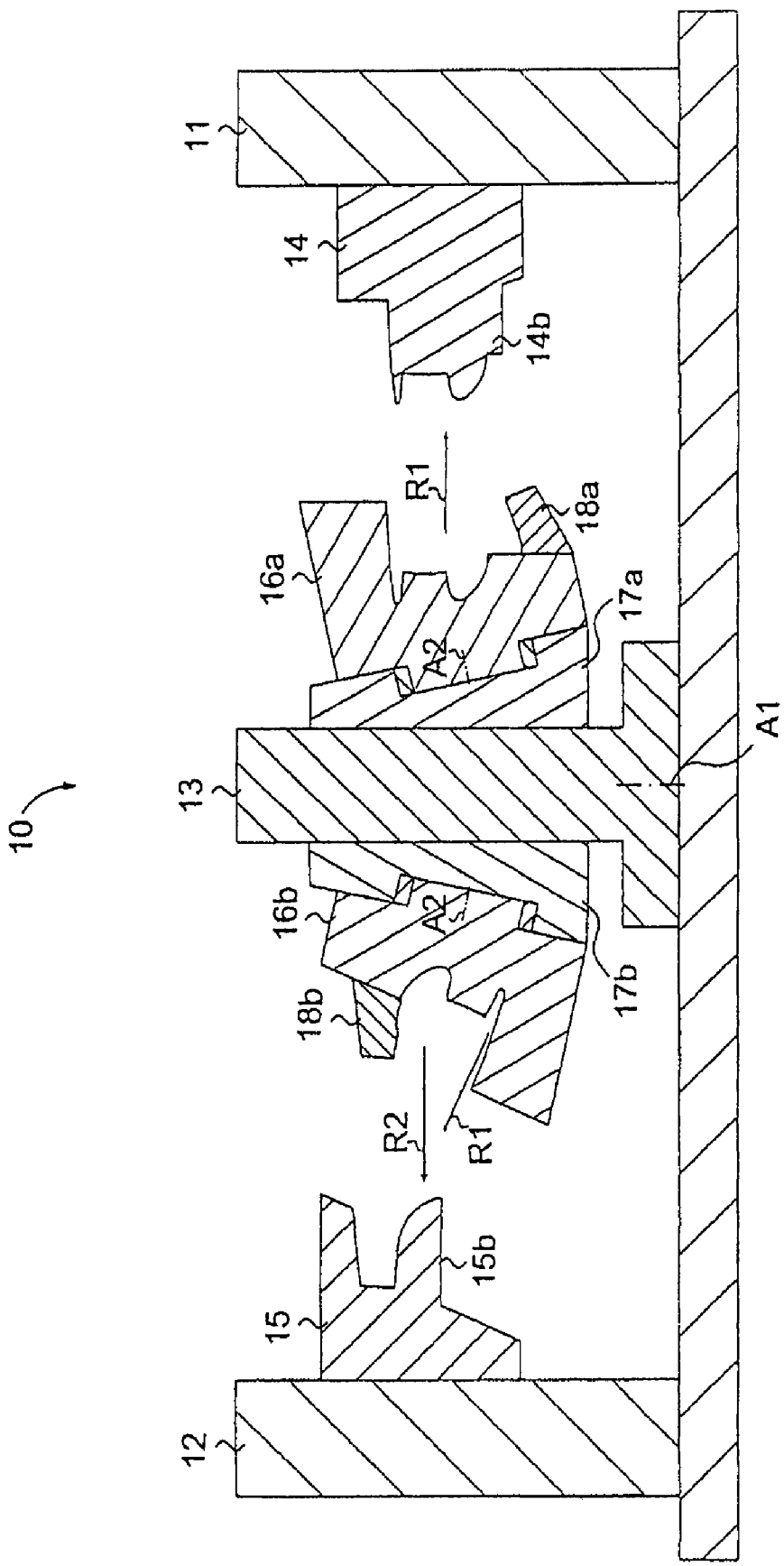
FIG. 2 shows a sectional illustration of a first embodiment of a turning plate injection moulding machine in the opened state.

FIG. 2 shows a schematic cross-sectional illustration of an injection moulding machine 10 which is implemented as a turning plate machine. The injection moulding machine comprises two clamping plates 11, 12, between which a turning plate 13 is arranged. The clamping plates 11, 12 can be moved towards each other and away from each other by means of hydraulics (not illustrated) of the injection moulding machine 10. The turning plate 13 arranged centrally between the two clamping plates 11, 12 in the translational direction (in the following also designated the closing direction) can be rotated about a turning axis A1 oriented at right angles to the closing direction. Rotation of the turning plate 13 through 180° has the effect that a side of the turning plate 13 previously facing the clamping plate 11 faces the clamping plate 12 after the 180° turn.

The clamping plate 11 holds a first core mould plate 14, while a second core mould plate 15 is fitted to the second clamping plate 12. The turning plate 13 holds two identical die mould plates 16$a$, 16$b$ via respective rotary bearings 17$a$, 17$b$. The axes of rotation A2 defined by the rotary bearings 17$a$, 17$b$ are oriented obliquely with respect to the closing direction (translational direction) of the clamping plates 11, 12 of the injection moulding machine 10. As can be seen in FIG. 2, the die mould plate 16$b$ is rotated through 180° with respect to the (identical) die mould plate 16$a$. The die mould plates 16$a$, 16$b$ are equipped with sliders 18$a$, 18$b$. In the position facing the first core mould plate 14, the slider 18$a$ is withdrawn radially outwards, while, after the turning plate 13 has been turned, the slider 18$b$ is displaced radially inwards and extends a contour line of the hollow in the die mould plate 16$b$.

Figure 3:
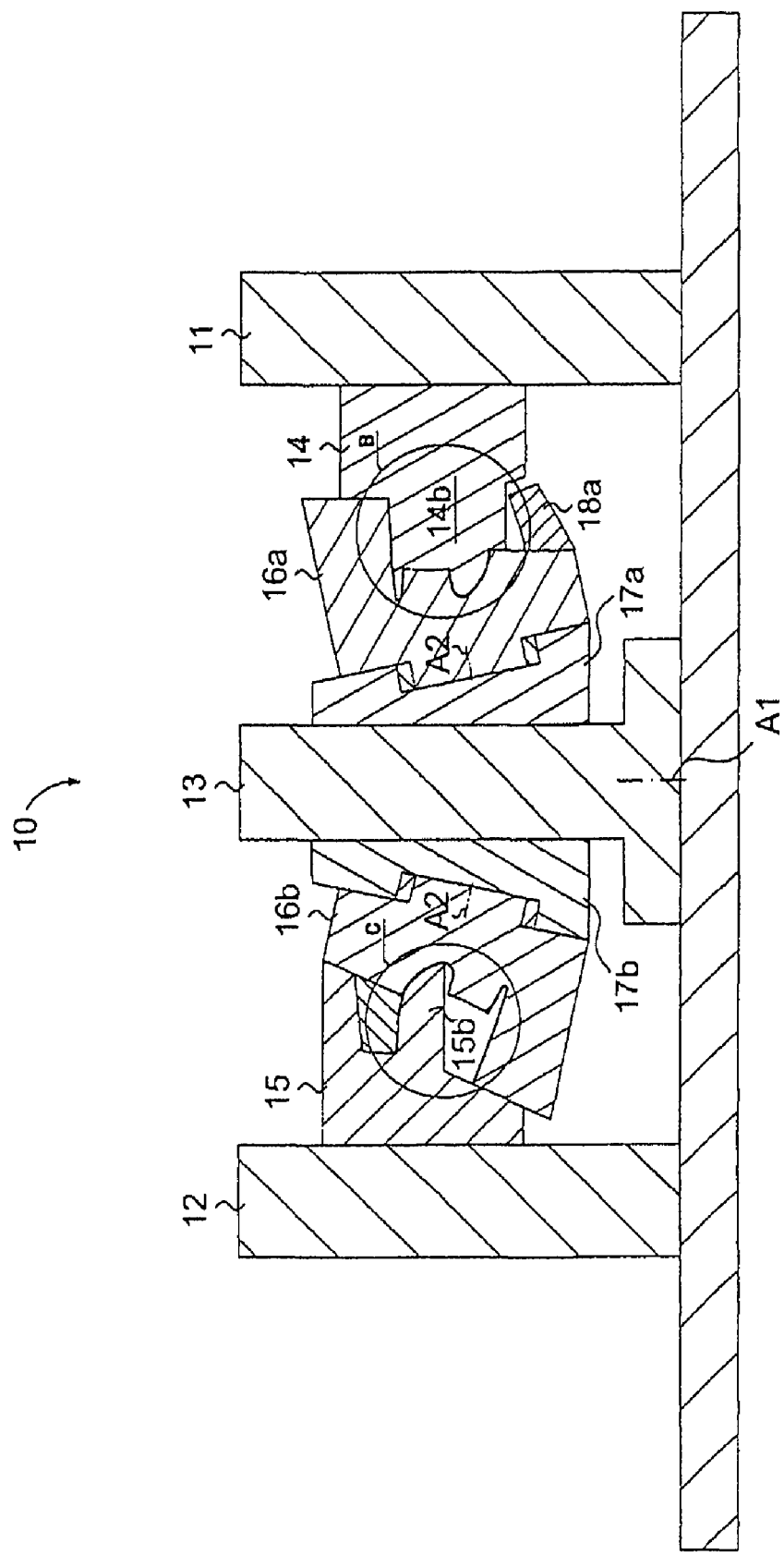
FIG. 3 shows the turning plate injection moulding machine illustrated in FIG. 2 in the closed state.

The production of the injection moulding 1 will be explained with reference to FIGS. 3, 4 and 5. FIG. 3 shows the injection moulding machine 10 in the closed state. The first section 1$a$, 1$c$1 of the injection moulding 1 is injection-moulded in a cavity which is formed between the first core mould plate 14 and the die mould plate 16$a$; see the detail B in FIG. 4. The withdrawn slider 18$a$ permits the cavity to be sealed at the edge by means of a sealing surface 14$a$ on the first core mould plate 14.

Following the production of the first section 1$a$, 1$c$1 of the injection moulding 1, the moulds 14, 16$a$ and 15, 16$b$ are opened by moving the clamping plates 11, 12, see FIG. 2. The first section 1$a$, 1$c$1 of the injection moulding 1 remains in the hollow in the first die mould plate 16$a$. The turning plate 13 is then turned about the turning axis A1 by means of a 180° rotation, the two die mould plates 16$a$, 16$b$ are rotated through 180° about the axes of rotation A2, and the sliders 18$a$, 18$b$ are brought into the opposite slider position according to FIG. 2. The mould is then closed again, see FIG. 3. FIG. 5 illustrates the injection-moulding of the second section 1$c$2 onto the first section 1$a$, 1$c$1 of the injection moulding in a cavity which is bounded by a mould core 15$b$ of the second core mould plate 15, a contoured surface of the slider 18$b$ and an end section of the subregion 1$c$1 of the injection moulding 1. The action of injection moulding the second section 1$c$2 onto the first section 1$a$, 1$c$1 of the injection moulding 1 leads to an integral, non-detachable connection in the overlap region 1$c$3.

Figure 5:
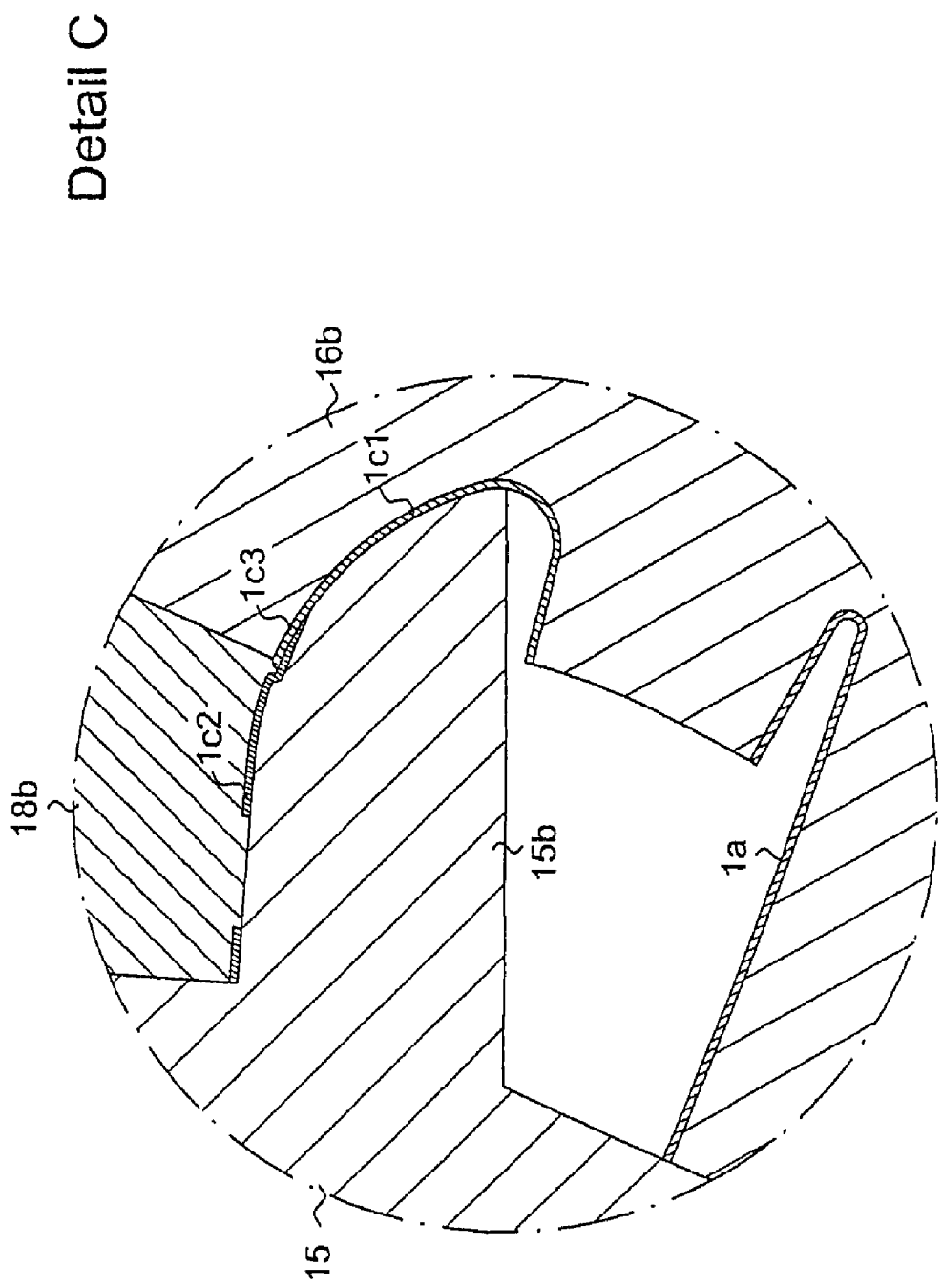
FIG. 5 shows the detail C from FIG. 3 in an enlarged sectional illustration.

Since the mould core 15$b$ merely has to form a seal for the injection-moulding cavity in the region of the second section 1$c$2 to be injection-moulded on, and the section 1$a$, 1$c$1 of the injection moulding that has already been finished has been repositioned or pivoted with respect to the closing direction of the injection moulding machine 10 by means of the rotation about the axis A2, de-moulding of the finished injection moulding 1 is readily possible, as can be seen from FIG. 5.

Figure 6:
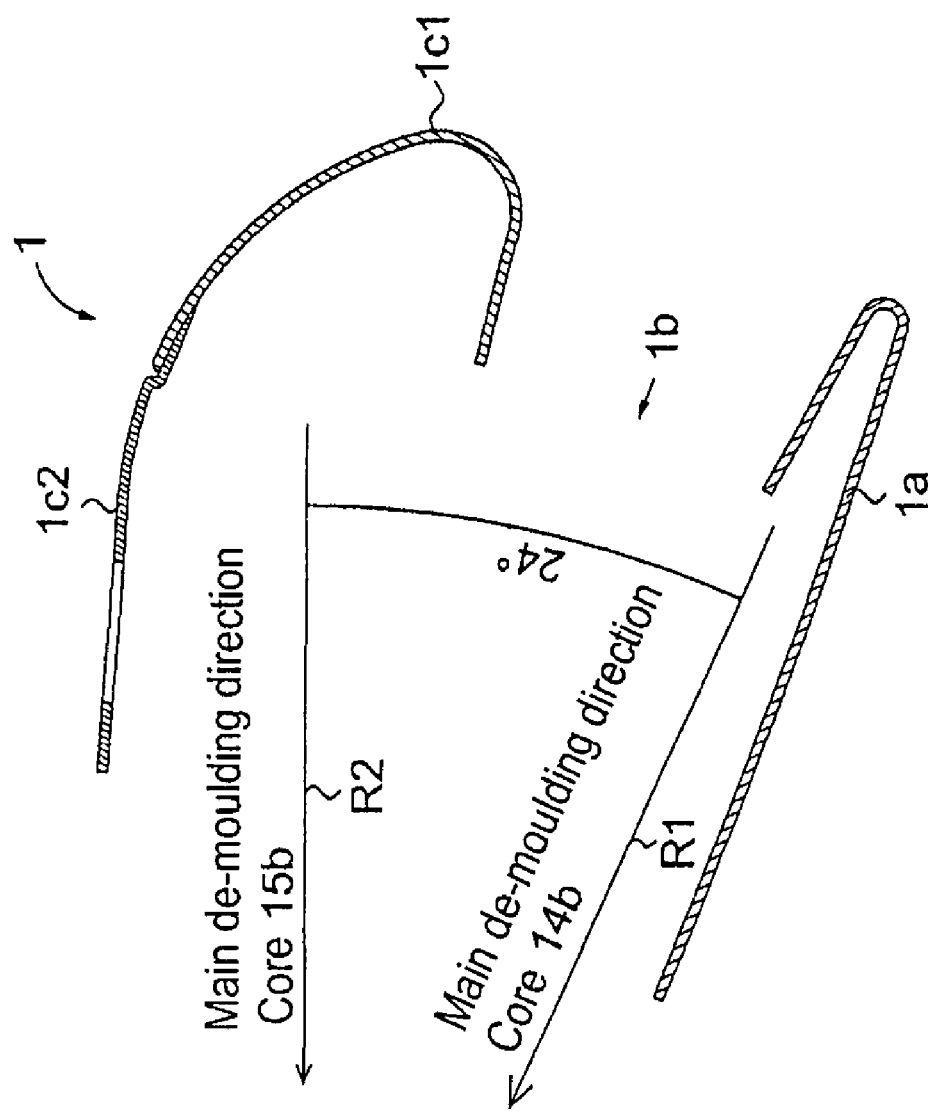
FIG. 6 shows an illustration of the de-moulding directions in relation to the injection moulding in a sectional illustration.

FIG. 6 illustrates the fact that, in relation to the injection moulding 1, by means of rotation of the mould plate 16$a$ or 16$b$ about the axis. A2 and the associated repositioning of the mould plate 16$a$ or 16$b$, two different main de-moulding directions are implemented, namely the main de-moulding direction R1 for the mould core 14$b$ and the main de-moulding direction R2 for the mould core 15$b$. Given an oblique position of the axis A2 at an angle of 12° with respect to the closing direction, the angle arising between the two main de-moulding directions is 24°. Other angles between the main de-moulding directions in relation to the injection moulding 1 are likewise possible. In order to avoid misunderstandings, it is pointed out that the two main de-moulding directions are identical in relation to the injection moulding machine 10 and always extend in the translational direction (closing direction) of the injection moulding machine 10. The different main de-moulding directions arise in relation to the injection moulding 1 to be produced and are brought about by means of the repositioning or pivoting of the first section 1$a$, 1$c$1 of the injection moulding with respect to the closing direction—effected by the 180° rotation of the die mould plate 16a, 16b about the oblique axis A2.

Figure 7:
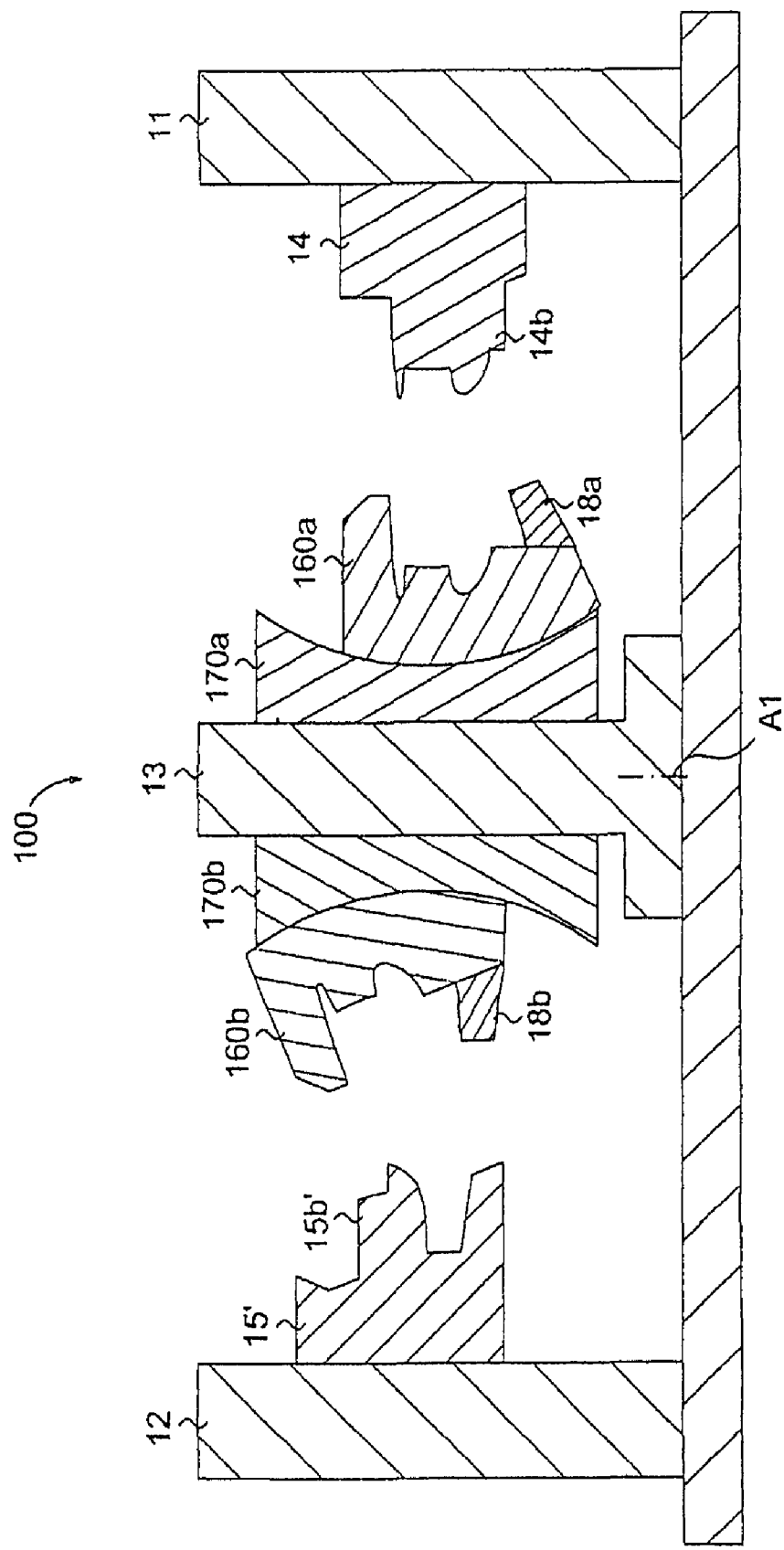
FIG. 7 shows a sectional illustration of a second exemplary embodiment of a turning plate injection moulding machine in the opened state.
Figure 8:
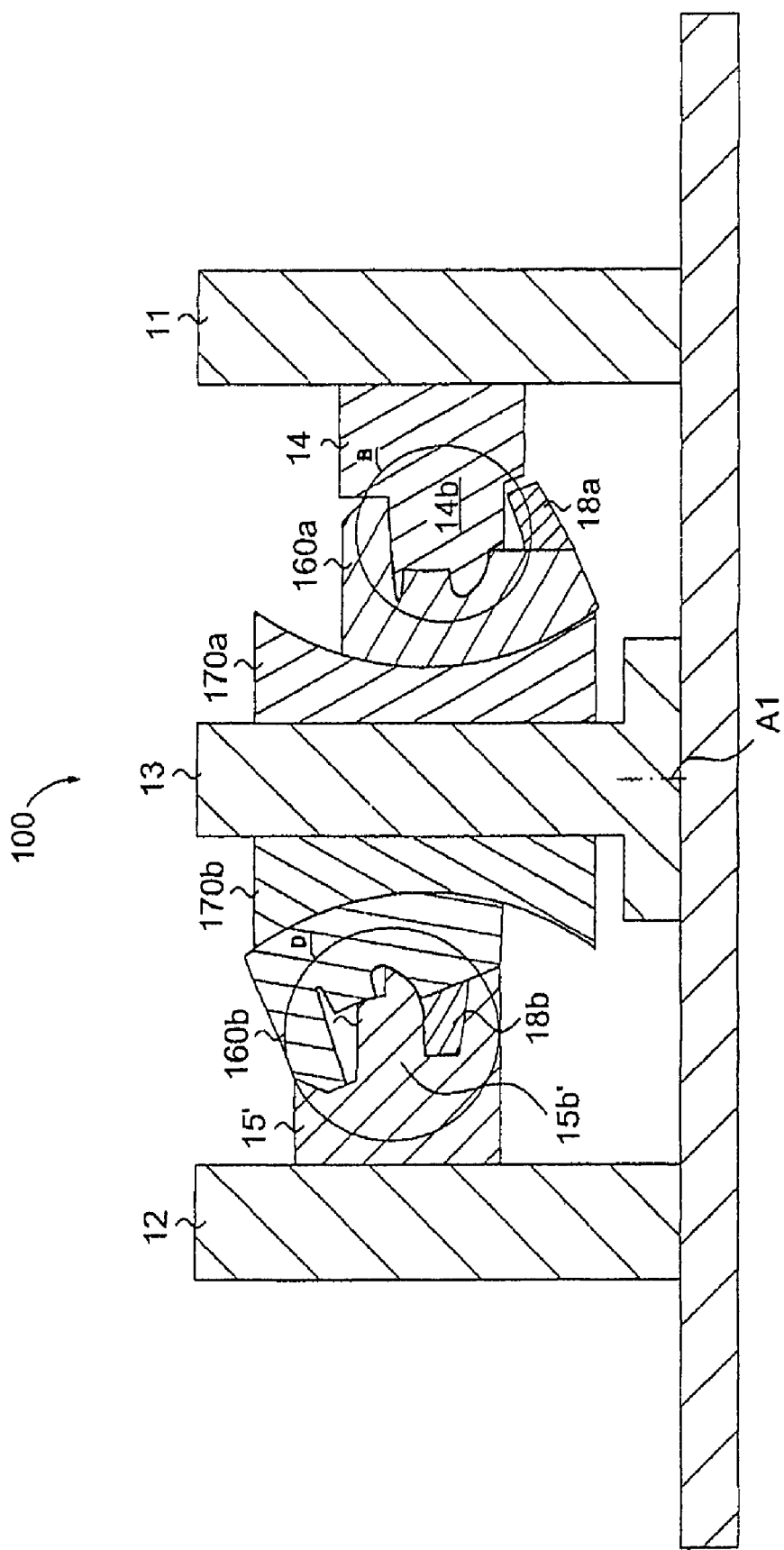
FIG. 8 shows the turning plate injection moulding machine illustrated in FIG. 7 in the closed state.

FIGS. 7, 8 and 9 relate to a second exemplary embodiment of a turning plate machine 100 which differs from the turning plate machine 10 substantially only in the fact that, instead of the rotary bearings 17a, 17b, bearing shells 170a, 170b are provided between the turning plate 13 and the die mould plates 160a, 160b. Identical reference symbols are used for identical or functionally similar parts. As can be seen from a comparison of FIGS. 2, 3 with the corresponding FIGS. 7, 8, the second core mould plate 15' is rotated through 180° as compared with the second core mould plate 15 and, for example, also has a different mould core 15b' (but which could also be implemented just as well in the case of the core mould plate 15). The realignment (pivoting) of the first section 1a, 1c1 of the injection moulding in the case of the second exemplary embodiment is performed by means of sliding the die mould plates 160a, 160b in the bearing shells 170a, 170b after turning the turning plate 13. Therefore, it is not rotational pivoting but linear pivoting which takes place here. Otherwise, the sequences explained in relation to the first exemplary embodiment also apply with the same effect to the second exemplary embodiment.

Figure 4:
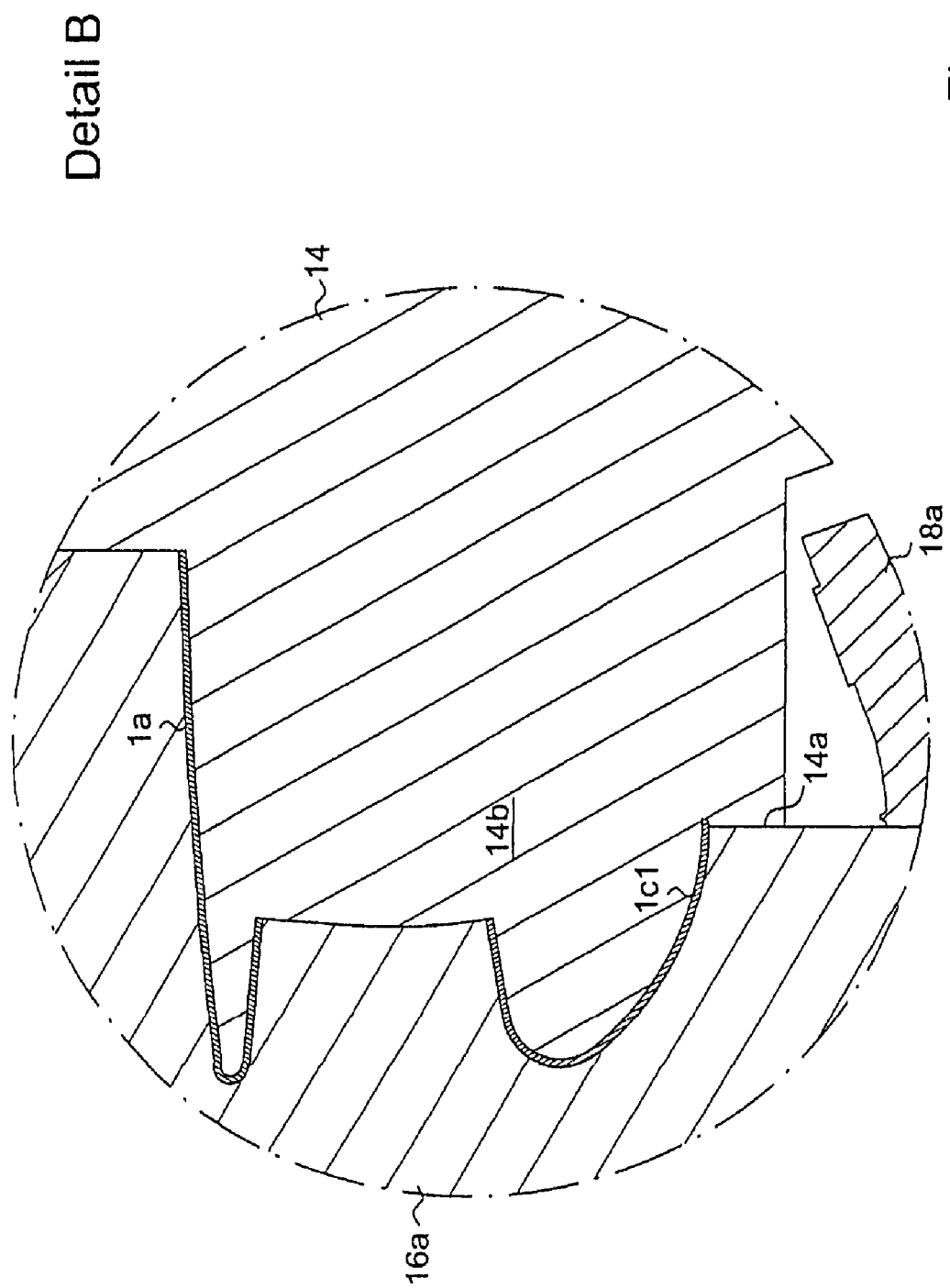
FIG. 4 shows the detail B from FIG. 3 in an enlarged sectional illustration.

FIGS. 4 and 6 apply to the same extent to the second exemplary embodiment. In relation to the detail D, FIG. 9 replaces FIG. 5 for the second exemplary embodiment.

It is pointed out that the invention can also be implemented in a turning plate injection moulding machine in which the axis of rotation of the turning plate is oriented at right angles to the axis of rotation A1 (and of course at right angles to the translational direction). The plate turning is then carried out not with a vertical turning axis but with a horizontal turning axis.

Furthermore, it is pointed out that the device according to the invention can also be implemented in a conventional two-plate injection moulding machine. In this case, between the two clamping plates of the injection moulding machine, there is a mould which comprises a core mould plate having two mould cores and a rotatably mounted die mould plate having two die hollows. One speaks of two "nests" in the mould. In each operation (opening/closing) of the injection moulding machine, the die mould plate is rotated by 180°, by which means the finished first section 1a, 1c1 of the injection moulding is rotated out of its position opposite the first mould core and is brought into a position opposite the second mould core. Rotating the die mould plate has the effect of "mould turning" and thus corresponds to the turning of the turning plate in a turning plate injection moulding machine. The different de-moulding directions in relation to the first section 1a, 1c1 of the injection moulding result from the fact that imaginary axes of the two diet hollows, running in the same direction, enclose an angle (e.g. 24°) in relation to each other.

A further possible variation consists in the die mould plates shown in the exemplary embodiments being replaced by core mould plates and vice versa. In this case, the turning plate 13 bears two core mould plates, and when the turning plate is turned, the first section 1a, 1c1 of the injection moulding remains on the core of the core mould plate used for its production.

The invention claimed is:

1. An injection moulding machine, comprising:
   an injection moulding device for producing an injection moulding having:
   a first and a second mould plate which can be moved relative to each other in a closing direction, and
   a mechanism to reposition at least one of the mould plates in such a way that at least two different de-moulding directions in relation to the injection moulding can be implemented; and
   a turning plate surrounded by two holding plates, wherein
   the mechanism to reposition the at least one of the mould plates is arranged on the turning plate or on the two holding plates; and
   the turning plate can be rotated about a turning axis which runs in a plane parallel to the holding plates and is oriented at right angles to the closing direction.

2. The injection moulding machine according to claim 1, wherein
   the mechanism comprises a rotary bearing holding the repositionable mould plate end having a rotary bearing axis oriented obliquely with respect to the closing direction.

3. The injection moulding machine according to claim 1, wherein
   the mechanism comprises a bearing element having a curved surface, the repositionable mould plate being displaceable or pivotabe along its curved surface.

4. The injection moulding machine according to claim 1, wherein
   the repositionable mould plate is a hollow plate.

5. The injection moulding machine according to claim 4, wherein
   the hollow plate has a contour slider.

6. The injection moulding machine according to claim 1, wherein
   the repositionable mould plate is a core mould plate.

7. The injection moulding machine according to claim 1, wherein
   the mechanism to reposition the repositionable mould plate effects pivoting of the repositionable mould plate with respect to the closing direction.

8. The injection moulding machine according to claim 1, wherein
   the turning plate, can be rotated about a turning axis which runs in a plane at right angles to the holding plates and is oriented at right angles to the closing direction.

9. The injection moulding machine according to claim 2, wherein
   the repositionable mould plate is a hollow plate.

10. The injection moulding devise-machine according to claim 2, wherein
    the repositionable mould plate is a core mould plate.

11. The injection moulding machine according to claim 2, wherein
    the mechanism to reposition the repositionable mould plate effects pivoting of the repositionable mould plate with respect to the closing direction.

\* \* \* \* \*

UNITED STATES PATENT AND TRADEMARK OFFICE
CERTIFICATE OF CORRECTION

| | | |
|---|---|---|
| PATENT NO. | : 7,762,805 B2 | Page 1 of 1 |
| APPLICATION NO. | : 11/819322 | |
| DATED | : July 27, 2010 | |
| INVENTOR(S) | : Franz Josef Summerer | |

It is certified that error appears in the above-identified patent and that said Letters Patent is hereby corrected as shown below:

Column 6, Line 28 in Claim 3, delete "pivotabe" and insert -- pivotable --, therefor.

Column 6, Line 51 in Claim 10, delete "devise-machine" and insert -- machine --, therefor.

Signed and Sealed this
Seventh Day of June, 2011

David J. Kappos
*Director of the United States Patent and Trademark Office*